United States Patent
Li et al.

(10) Patent No.: US 9,740,033 B2
(45) Date of Patent: Aug. 22, 2017

(54) TEST APPARATUS OF A DIRECT-LIGHT-TYPE BACKLIGHT MODULE

(71) Applicants: BOE TECHNOLOGY GROUP CO., LTD., Beijing (CN); BEIJING BOE VISION-ELECTRONIC TECHNOLOGY CO., LTD., Beijing (CN)

(72) Inventors: Mingjun Li, Beijing (CN); Yunlong Tian, Beijing (CN); Changjia Fu, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 316 days.

(21) Appl. No.: 14/409,085

(22) PCT Filed: Jun. 27, 2014

(86) PCT No.: PCT/CN2014/080911
§ 371 (c)(1),
(2) Date: Dec. 18, 2014

(87) PCT Pub. No.: WO2015/100983
PCT Pub. Date: Jul. 9, 2015

(65) Prior Publication Data
US 2016/0266419 A1   Sep. 15, 2016

(30) Foreign Application Priority Data
Dec. 30, 2013   (CN) .......................... 2013 1 0746094

(51) Int. Cl.
*G02F 1/00* (2006.01)
*G02F 1/13* (2006.01)
*G02F 1/1335* (2006.01)

(52) U.S. Cl.
CPC ...... *G02F 1/1309* (2013.01); *G02F 1/133602* (2013.01)

(58) Field of Classification Search
CPC ......... G02F 1/133602; G02F 1/133605; G02F 1/133608
(Continued)

(56) References Cited

U.S. PATENT DOCUMENTS

2009/0251885 A1   10/2009   Yen et al.
2013/0063669 A1*   3/2013   Mouri ............... G02F 1/133603
                                                            348/739

FOREIGN PATENT DOCUMENTS

CN   102495496 A   6/2012
CN   202583640 U   12/2012
(Continued)

OTHER PUBLICATIONS

Second Chinese Office Action Appln. No. 201310746094.2; Dated Jan. 28, 2016.
(Continued)

*Primary Examiner* — Kevin Pyo
(74) *Attorney, Agent, or Firm* — Ladas & Parry LLP

(57) ABSTRACT

Embodiments of the disclosure provide a test apparatus of a direct-light-type backlight module. The test apparatus comprises: a light-emitting-element fixing unit, configured for fixing a light emitting element; an optical-element fixing unit, configured for fixing an optical element into an optical path of the light emitted from the light emitting element; and
(Continued)

a test head (85), configured for testing the light emitted from the light emitting element and passing through the optical element.

18 Claims, 2 Drawing Sheets

(58) Field of Classification Search
USPC .............. 250/221, 239; 362/217.11–227.16, 362/249.01, 249.07
See application file for complete search history.

(56) References Cited

FOREIGN PATENT DOCUMENTS

| | | |
|---|---|---|
| CN | 202710878 U | 1/2013 |
| CN | 202793745 U | 3/2013 |
| CN | 103411755 A | 11/2013 |
| CN | 103698918 A | 4/2014 |
| JP | 2006-153844 A | 6/2006 |

OTHER PUBLICATIONS

International Preliminary Report on Patentability issued Jul. 5, 2016; PCT/CN2014/080911.
First Chinese Office Action Appln. No. 201310746094.2; Dated Jul. 10, 2015.
International Search Report Appln. No. PCT/CN2014/080911; Dated Sep. 30, 2014.

\* cited by examiner

TEST APPARATUS OF A DIRECT-LIGHT-TYPE BACKLIGHT MODULE

TECHNICAL FIELD

Embodiments of the disclosure relate to a test apparatus of a direct-light-type backlight module.

BACKGROUND

A liquid crystal display device is mainly formed by a liquid crystal display panel configured for filtering light and a backlight module configured for providing uniform light to the display panel. Direct-light-type backlight module is one kind of the backlight module. FIG. 1 is a schematic sectional view illustrating a structure of the direct-light-type backlight module known to the inventor. As illustrated in FIG. 1, the direct-light-type backlight module comprises a plurality of light source components 1 (for example, LED light bars), the light source components 1 are provided on a bottom portion of the reflection shade 21, an angle (called as folding angle) is formed between a lateral portion of the reflection shade 22 and the bottom portion of the reflection shade 21, the reflection shade 2 is configured for reflecting light emitted by the light source components 1 onto a diffusion plate 3, an optical film 4 (for example, comprising a plurality of films such as a prism sheet, an anti-reflection film) is provided on the light-output side of the diffusion plate 3 (that is, the side of the diffusion plate 3 away from the reflection shade 2), and a display panel 5 is provided on the light-output side of the optical film 4 (that is, the side of the optical film 4 away from the diffusion plate 3). FIG. 2 is a schematic top view illustrating a structure of the reflection shade of the direct-light-type backlight module known to the inventor. As shown in FIG. 2, LED light bars 1 are arranged parallel to each other on the bottom portion 21 of the reflection shade 2.

SUMMARY

Embodiments of the disclosure provide a test apparatus of a direct-light-type backlight module. The direct-light-type backlight module comprises a light emitting element and an optical element. The test apparatus comprises: a light-emitting-element fixing unit, configured for fixing the light emitting element; an optical-element fixing unit, configured for fixing the optical element into an optical path of the light emitted from the light emitting element; and a test head, configured for testing the light emitted from the light emitting element and passing through the optical element.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The optical performance of a liquid crystal display device depends on the structures of the components such as a light source, a reflection shade (for example, a folding angle of the reflection shade), a diffusion plate, an optical film, a display panel and the like, as well as depends on the arrangement manner of these components (for example, a distance between the light source and the diffusion plate). During designing a new product, respective components are needed to be assembled together to form a backlight module or a display device so as to test the performance of the new product. But sizes, specifications and the like of these components generally are not matched, thus these components are difficult to be assembled directly. In order to solve such problem, a model generally is exclusively formed by choosing components that are match with each other and the test is performed on the model; however, in this case, the cost is increased, and time and energy are wasted. Accordingly, one of the problems to be solved by embodiments of the disclosure is to provide a test apparatus of a direct-light-type backlight module, so that the performance of the direct-light-type backlight module can be tested conveniently.

In the test apparatus of the direct-light-type backlight module provided by embodiments of the disclosure, fixing units for fixing the components, such as the reflection shade, the diffusion plate, the optical film and the like, are provided. Thus, during the test, the components are respectively fixed onto their fixing units to form a simulation backlight module and the test is performed on the simulation backlight; and in this case, it is not necessary to exclusively form the model. Therefore, by using the test apparatus of the direct-light-type backlight module according to the embodiments of the disclosure, the test process can be simplified, the test time can be shortened and the cost can be reduced.

Figure 1:
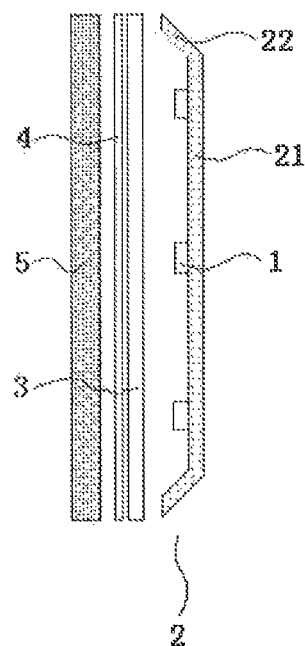
FIG. 1 is a schematic sectional view illustrating a structure of a direct-light-type backlight module according to one technique.
Figure 2:
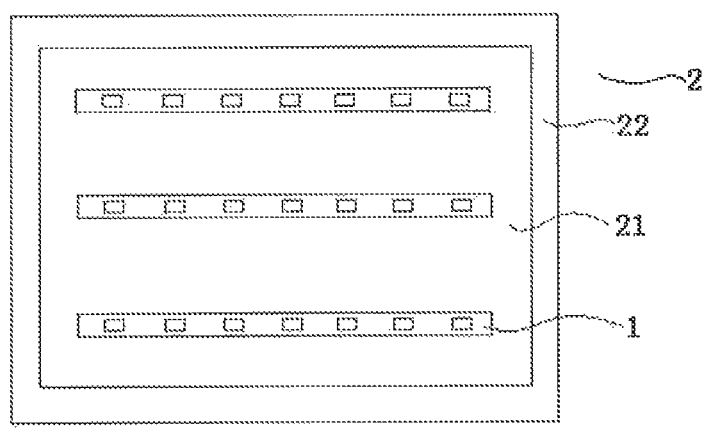
FIG. 2 is a schematic top view illustrating a structure of a reflection shade of the direct-light-type backlight module according to one technique.
Figure 3:
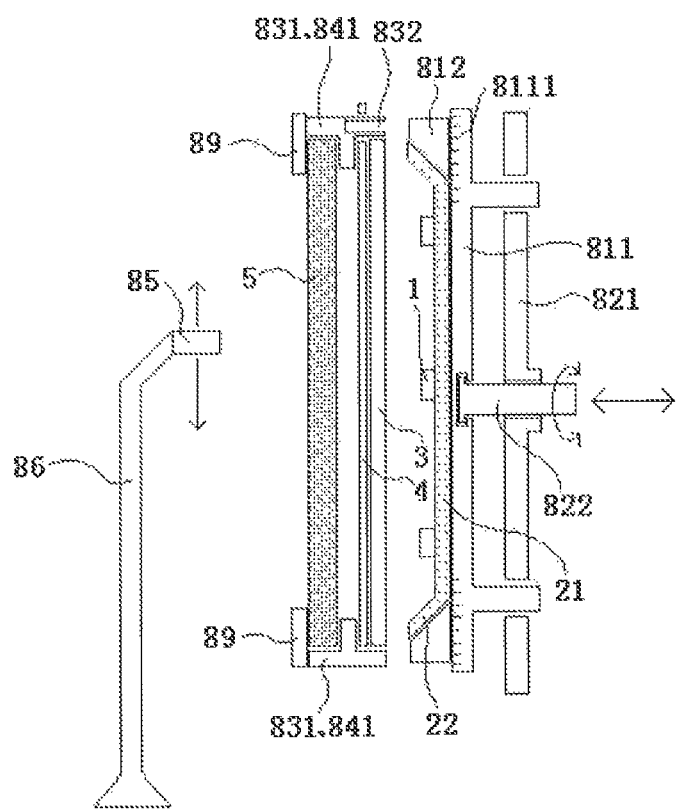
FIG. 3 is a schematic sectional view illustrating a structure of a test apparatus of a direct-light-type backlight module according to an embodiment of the disclosure.

Embodiments of the disclosure provide the test apparatus of the direct-light-type backlight module, and the direct-light-type backlight module comprises a light emitting element and an optical element. As illustrated in FIG. 3, the test apparatus of the direct-light-type backlight module comprises a light-emitting-element fixing unit, an optical-element fixing unit and a test head 85. The light-emitting-element fixing unit is configured for fixing the light emitting element; the optical-element fixing unit is configured for fixing the optical element into an optical path of the light emitted from the light emitting element; and the test head is configured for testing the light emitted from the light emitting element and passing through the optical element.

In an example, the light emitting element of the direct-light-type backlight module comprises a reflection shade 2 and a light source component 1 fixed inside the reflection shade. The light-emitting-element fixing unit is configured for fixing the reflection shade 2 and the light source component 1 fixed inside the reflection shade 2.

The reflection shade 2 is one of the important components of the direct-light-type backlight module, and is made of a material of high reflectance such as aluminium. The reflection shade 2 comprises a bottom portion and a lateral portion, the bottom portion and the lateral portion form an angle (for example, called as folding angle) therebetween. The light source component 1 (for example, a LED light bar, a cold cathode fluorescent tube) is provided on the bottom portion of the reflection shade 21, so that the reflection shade 2 is capable of reflecting the light emitted by the light source component 1 to a diffusion plate so as to enhance the mixture of light and increase the utilization efficiency of light. The size, the folding angle (for example, the value of the folding angle) and the like of the reflection shade 2 have an important influence on the optical performance of the display device. For example, if the folding angle of the reflection shade 2 does not match with a light mixing distance (that is, a distance between the light source component 1 and the diffusion plate 3), the size of the display panel 5 and so on, dark regions may occur around four edges of the display panel 5.

For example, as illustrated in FIG. 3, the light-emitting-element fixing unit comprises a support plate 811 configured for contacting the bottom portion of the reflection shade 21. The support plate 811 provides support to the backlight module, so as to prevent the backlight module from tilting during the test process, which otherwise will affect the accuracy of the test result.

A detachable wedge block 812 is provided on the support plate 811, and the wedge block 812 is configured to contact the lateral portion of the reflection shade 22 so as to fix the reflection shade 2.

In other words, as illustrated in FIG. 3, the support plate 811 contacts the outside of the bottom portion of the reflection shade 21, and a plurality of wedge blocks 812 are provided on the support plate 811; an angle between a lateral portion of each wedge block 812 and a bottom portion of the wedge block 812 matches with the folding angle of the reflection shade 2, so that the lateral portion of each wedge block contacts the lateral portion of the reflection shade 22 and the reflection shade 2 is fixe by the wedge block 812 and the support plate 811 in a clamping way.

In an example, the detachable connection between the wedge block 812 and the support plate 811 may be realized in many different ways. For example, the wedge block 812 is adhered to the support plate 811, or the wedge block 812 is adsorbed to the support plate 811 in magnetic manner or the like, or a plurality of small holes are provided in the support plate 811 so that the wedge blocks 812 are fitted into the holes; and so on. Detailed descriptions of these detachable connections are omitted herein for simplicity.

Because the wedge block 812 is detachable, when the reflection shades 2 with different sizes and folding angles are tested, respective reflection shade 2 can be fixed by choosing the wedge block 812 with an appropriate angle between the lateral portion and the bottom portion and placing the wedge block 812 at an appropriate position. So, the light-emitting-element fixing unit can be used to fix various different reflection shades 2.

In an example, as illustrated in FIG. 3, a scale 8111 configured for marking the position of the wedge block 812 is further provided on the support plate 811. In other words, the scale 8111 is provided on the support plate 811 so as to easily determine the position of the wedge block 812. In this case, the wedge block 812 can be positioned more easily and more accurately.

In another example, the wedge block 812 may be replaced by other components. For example, the wedge block 812 may be a metal sheet bended into a "V-shape". The apex angle of V-shaped metal sheet is adjustable (for example, by making the V-shaped metal sheet deformed to different extents). Therefore, the reflection shades 2 with different folding angles can be tested by merely adjusting the apex angle of the V-shaped metal sheet.

In another example, the optical-element fixing unit may be in other forms. For example, the optical-element fixing unit is a plate with an concave portion, and the shape, size, side angle and so on of the concave portion match with the reflection shade 2, so that the reflection shade 2 are capable of being embedded into the concave portion. Thus, the reflection shades 2 of different specifications can be tested by choosing plates with different concave portions.

In the test apparatus of the direct-light-type backlight module provided by embodiments of the disclosure, the optical-element fixing unit is configured for fixing the diffusion plate 3 and the optical film 4 on the light-output side of the light-emitting-element fixing unit.

The diffusion plate 3 and the optical film 4 are configured to make the light from the reflection shade 2 more uniform and to increase the emitting angle of light, so that a better display effect are achieved.

In an example, the optical-element fixing unit comprises a plurality of diffusion-plate positioning bars 831 configured for contacting the lateral portions of the diffusion plate 3. The diffusion plate 3 has a cube structure as a whole, its two largest major surfaces opposite to each other are a light-output surface and a light-input face, and the four side surfaces that are perpendicular to the light-emitting surface and the light-output surface are lateral portions of the diffusion plate 3. The optical-element fixing unit fixes the diffusion plate 3 into the test apparatus by the diffusion-plate positioning bar 831 contacting the lateral portion of the diffusion plate 3. For example, each lateral portion of the diffusion plate 3 is provided with one diffusion-plate positioning bar 831 so as to ensure the stability. Compared with a fixing structure using screw, this fixing structure using "positioning bar" in the embodiments of the disclosure is simple and capable of conveniently assembling and disassembling, so that the test time can be saved.

In an example, the optical-element fixing unit comprises at least one movable diffusion-plate positioning bar 831 that is movable in a plane parallel to the major surface of the diffusion plate 3.

In other words, among the plurality of diffusion-plate positioning bars 831, one or more of the diffusion-plate positioning bars 831 are moveable, so that the diffusion plates 3 with various different sizes can be fixed by merely moving the movable diffusion-plate positioning bars 831 to appropriate positions.

For example, from the view of simplifying the structure, at least one diffusion-plate positioning bar 831 is fixed. In this way, the lateral portion of the diffusion plate 3 is firstly contact with the at least one fixed diffusion-plate positioning bar 831 during assembling, and then the other movable diffusion-plate positioning bars 831 are moved to finally fix the diffusion plate 3.

The movable diffusion-plate positioning bar 831 are of various forms. For example, two ends of the movable diffusion-plate positioning bar 831 are respectively provided in a slide rail, so that the movable diffusion-plate positioning bar 831 moves along the side rail and is fixed upon arriving the appropriate position. For another example, a plurality of positioning holes are provided on a frame configured for supporting the movable diffusion-plate positioning bar 831, so that the movable diffusion-plate positioning bar 831 are fixed at different positions by being placed into different positioning holes. Detailed descriptions of the movable diffusion-plate positioning bar 831 are omitted herein for simplicity.

It should be understood that the shape of the above-mentioned "diffusion-plate positioning bar 831" is various. For example, the diffusion-plate positioning bar 831 is of elongated shape, so that the contact area between the diffusion-plate positioning bar 831 and the diffusion plate 3 is increased and fixing effect is improved. For example, the diffusion-plate positioning bar 831 is of "L" shape, and in this way, each diffusion-plate positioning bar 831 is capable of fixing two lateral portions of the diffusion plate 3. Thus, totally two diffusion-plate positioning bars 831 (for example, one is fixed, and the other is movable) are provided to fix four sides of the diffusion plate 3, and this structure is simple and easy to be realized.

In an example, the optical element fixing unit further comprises a suspension member 832 configured for hanging the optical film 4.

Because the material of the optical film 4 and the material of the diffusion plate 3 have different thermal expansion coefficients, the optical film 4 and the diffusion plate 3 are generally placed to be adjacent to each other but be not adhered to each other so that it is needed to respectively fix the optical film 4 and the diffusion plate 3. In order that the optical film 4 functions best, it is better that the optical film 4 closely contact the light-output surface of the diffusion plate 3. For example, the suspension member 832 is provided in the optical-element fixing unit (for example, the suspension member 832 is provided on the diffusion-plate positioning bar 831) so as to hang the optical film 4. A suspension-point couple element is provided on the optical film 4 and couples with the suspension member 832. Because the diffusion-plate positioning bar 831 itself is configured for fixing the diffusion plate 3, the position relation between the diffusion plate 3 and the optical film 4 can be easily determined if directly providing the suspension member 832 on the diffusion-plate positioning bar 831.

For example, the test apparatus of the direct-light-type backlight module provided by embodiments of the disclosure further comprises a distance adjusting unit, which is configured for adjusting the distance between the light-emitting-element fixing unit and the optical-element fixing unit.

In the direct-light-type backlight module, the "mixing light distance" refers to the distance between the light source component 1 (for example, the LED light bar) and the diffusion plate 3, and for example is 15 mm (millimeter) to 40 mm. The mixing light distance is an important parameter determining the performance of the direct-light-type backlight module, so the adjustment of the distance has a great significance to the performance of the direct-light-type backlight module. By providing the distance adjusting unit, the mixing light distance can be adjusted, so that the test apparatus of the direct-light-type backlight module of the embodiments can test the performance of the backlight module with different mixing light distances.

For example, as illustrated in FIG. 3, the distance adjusting unit comprises a fixing rack 821 and a screw bolt 822. The fixing rack 821 is provided out of the optical path of the light from the light emitting element fixed by the light-emitting-element fixing unit, and has a screw nut portion. For example, the fixing rack 821 is placed on the backside of the light-emitting-element fixing unit (namely, the side opposite to the light-output side of the light-emitting-element fixing unit). For example, the screw bolt comprises a bolt head and a bolt body with a thread, the bolt body penetrates into the screw nut portion of the fixing rack, and the bolt head is connected to the light-emitting-element fixing unit (for example, the support plate 811) in a rotatable way.

Therefore, as illustrated in FIG. 3, when the screw bolt 822 is rotated, the screw bolt 822 moves upwards or downwards (as indicated by the arrow) with respect to the fixing rack 821, and thus the support plate 811 is driven to move upwards or downwards. Accordingly, the reflection shade 2 and the light source component 1 that are fixed on the support plate 811 move upwards or downwards, so that the mixing light distance can be adjusted.

The distance adjusting unit using the fixing rack and screw bolt has a simple and stable structure, and a high adjusting accuracy can be achieved if the distance adjusting unit is used in combination with scales.

It should be understood that the distance adjusting unit may be of other forms. For example, the support plate 811 is placed in a sliding rail, and the support plate 81 moves along the sliding rail so as to adjust the mixing light distance. Detailed descriptions for the distance adjusting unit are omitted here for simplicity.

The test head 85 is provided on the light-output side of the optical-element fixing unit and configured for testing light passing through the diffusion plate 3 and the optical film 4.

After the backlight module is assembled on the test apparatus, the light emitted from the backlight module is tested so that the performance of the backlight module is determined. The test of the light is performed by the test head 85.

In an example, the test head 85 is provided on a test rack 86, and the test rack 86 moves the test head 85 in a plane parallel to the diffusion plate 3, for example, in the direction of the horizontal double-headed arrow illustrated in FIG. 3.

In other words, the test head 85 is provided on the test rack 86 and the test rack 86 moves the test head 85, so as to test the light emitted at different positions. For example, the test rack 86 is in a form similar to a microphone holder.

If the test rack 86 is not provided, it is feasible to fix the test head 85 by hand.

In an example, the test apparatus of the direct-light-type backlight module of the embodiment further comprises a display-panel fixing unit which is configured for fixing the display panel 5 between the optical-element fixing unit and the test head 85, so as to obtain a more accuracy test result.

The test apparatus of the direct-light-type backlight module of the embodiments fixes the display panel 5 as well, so that the test head 85 detects the light filtered by the display panel 5 to better determine whether the backlight module and the display panel 5 are matched with each other or not.

For example, the display-panel fixing unit comprises a plurality of panel positioning bars 841 configured for contacting a lateral portion of the display panel 5. The display panel 5 is of a cube structure as a whole, its two largest major surfaces opposite to each other are a light-emitting surface and a light-output surface, and the four side surfaces that are perpendicular to the light-emitting surface and the light-output surface are lateral portions of the display panel 5. The panel positioning bar 841 comprises at least one movable panel positioning bar 841 that is movable in a plane parallel to the major surface of the display panel 5.

In other words, the display-panel fixing unit adopts the positioning bar similar to the above-mentioned fixing unit of the diffusion plate 3, and one or more of the panel positioning bars 841 are movable so that the display panels 5 with different sizes can be fixed.

As illustrated in FIG. 3, for example, the panel positioning bar 841 and the diffusion-plate positioning bar 831 is integrally formed. Namely, the integrally-formed positioning bar has the function of fixing the display panel 5 and the diffusion plate 3 simultaneously, so that the structure of the apparatus can be simplified.

It should be understood that, the test apparatus of the direct-light-type backlight module provided by the embodiments may further include other components that are not shown in FIG. 3.

For example, the other components include supporting structures (for example, frames) configured for supporting the above-mentioned positioning bars and the support plate 811; in the meantime, the above-mentioned supporting structures for example are connected together by some connection pieces so that the test apparatus of the direct-light-type backlight module has integrality. These supporting structures, connecting pieces and the like may adopt any known forms.

For another example, as illustrated in FIG. 3, a plurality of penetrating bars further protrude from the backside of the support plate 811 (a side away from the reflection shade 2) and penetrate into holes in the fixing rack 821, so as to guarantee the stability of the support plate 811.

For another example, as illustrated in FIG. 3, in addition to the above-mentioned positioning bars, a stopping bar 89 is further provided on the edge of the light-output surface of the display panel 5, to prevent the display panel 5 from falling off.

It should be noted that, the display panel may be any display panel that needs the backlight module, such as a liquid crystal display panel, an electronic paper and the like.

According to the above descriptions, embodiments of the disclosure at least provide the following structures.

(1) A test apparatus of a direct-light-type backlight module is provided, the direct-light-type backlight module comprises a light emitting element and an optical element; and the test apparatus comprises: a light-emitting-element fixing unit, configured for fixing the light emitting element; an optical-element fixing unit, configured for fixing the optical element into an optical path of the light emitted from the light emitting element; and a test head, configured for testing the light emitted from the light emitting element and passing through the optical element.

(2) The test apparatus of the direct-light-type backlight module according to (1) further comprises a display-panel fixing unit, configured for fixing a display panel between the optical element fixed by the optical-element fixing unit and the test head.

(3) In the test apparatus of the direct-light-type backlight module according to (2), the display-panel fixing unit comprises a plurality of panel positioning bars configured for contacting a lateral portion of the display panel.

(4) In the test apparatus of the direct-light-type backlight module according to (3), at least one of the panel positioning bars is a movable panel positioning bar configured to be moveable in a plane parallel to a major surface of the display panel.

(5) The test apparatus of the direct-light-type backlight module according to any of (1) to (4), further comprises a distance adjusting unit, configured for adjusting a distance between the light-emitting-element fixing unit and the optical-element fixing unit.

(6) In the test apparatus of the direct-light-type backlight module according to (5), the distance adjusting unit comprises: a fixing rack, provided out of the optical path of the light from the light emitting element fixed by the light-emitting-element fixing unit and having a screw nut portion; and a screw bolt, comprising a bolt head and a bolt body with a thread, wherein the bolt body penetrates into the screw nut portion of the fixing rack, and the bolt head is connected to the light-emitting-element fixing unit in a rotatable way.

(7) In the test apparatus of the direct-light-type backlight module according to any of (1) to (6), the light emitting element comprises a reflection shade and a light source component fixed inside the reflection shade, and the light-emitting-element fixing unit comprises: a support plate, configured for contacting a bottom portion of the reflecting-shade; and a wedge block, connected to the support plate in a detachable way, and configured for contacting a lateral portion of the reflection shade so as to fix the reflection shade.

(8) In the test apparatus of the direct-light-type backlight module according to any of (1) to (7), the optical element comprises a diffusion plate, and the optical-element fixing unit comprises a plurality of diffusion-plate positioning bars configured for contacting a lateral portion of the diffusion plate.

(9) In the test apparatus of the direct-light-type backlight module according to (8), at least one of the diffusion-plate positioning bars is a movable diffusion-plate positioning bar configured to be movable in a plane parallel to a major surface of the diffusion plate.

(10) In the test apparatus of the direct-light-type backlight module according to (1) to (9), the optical element further comprises an optical film, and the optical-element fixing unit further comprises a suspension member configured for hanging the optical film.

(11) In the test apparatus of the direct-light-type backlight module according to (1) to (10), the test head is provided on a test rack, and the test rack is configured to move the test head in a plane parallel to a major surface of the diffusion plate.

The foregoing paragraphs have made a detailed description for the present disclosure with general illustrations and specific embodiments, but on the basis of the present disclosure, modifications or improvements may be made, and this is obvious for those skilled in the art. Therefore, all these modifications or improvements made without departing from the spirit of the present disclosure are within the scope of the disclosure.

This application claims the benefit of Chinese Patent Application No. 201310746094.2, filed on Dec. 30, 2013, which is hereby entirely incorporated by reference.

What is claimed is:

1. A test apparatus of a direct-light-type backlight module, wherein the direct-light-type backlight module comprises a light emitting element and an optical element; and the test apparatus comprises:
   a light-emitting-element fixing unit, configured for fixing the light emitting element;
   an optical-element fixing unit, configured for fixing the optical element into an optical path of the light emitted from the light emitting element; and a test head, configured for testing the light emitted from the light emitting element and passing through the optical element, wherein the light emitting element comprises a reflection shade and a light source component fixed inside the reflection shade, and the light-emitting-element fixing unit comprises: a support plate, configured for contacting a bottom portion of the reflecting-shade; and a wedge block, connected to the support plate in a detachable way, and configured for contacting a lateral portion of the reflection shade so as to fix the reflection shade.

2. The test apparatus of the direct-light-type backlight module according to claim 1, further comprising: a display-panel fixing unit, configured for fixing a display panel between the optical element fixed by the optical-element fixing unit and the test head.

3. The test apparatus of the direct-light-type backlight module according to claim 2, wherein the display-panel fixing unit comprises a plurality of panel positioning bars configured for contacting a lateral portion of the display panel.

4. The test apparatus of the direct-light-type backlight module according to claim 3, wherein at least one of the panel positioning bars is a movable panel positioning bar configured to be moveable in a plane parallel to a major surface of the display panel.

5. The test apparatus of the direct-light-type backlight module according to claim 1, further comprising: a distance adjusting unit, configured for adjusting a distance between the light-emitting-element fixing unit and the optical-element fixing unit.

6. The test apparatus of the direct-light-type backlight module according to claim 5, wherein the distance adjusting unit comprises:

a fixing rack, provided out of the optical path of the light from the light emitting element fixed by the light-emitting-element fixing unit and having a screw nut portion; and a screw bolt, comprising a bolt head and a bolt body with a thread, wherein the bolt body penetrates into the screw nut portion of the fixing rack, and the bolt head is connected to the light-emitting-element fixing unit in a rotatable way.

7. The test apparatus of the direct-light-type backlight module according to claim 1, wherein the optical element comprises a diffusion plate, and the optical-element fixing unit comprises a plurality of diffusion-plate positioning bars configured for contacting a lateral portion of the diffusion plate.

8. The test apparatus of the direct-light-type backlight module according to claim 7, wherein at least one of the diffusion-plate positioning bars is a movable diffusion-plate positioning bar configured to be movable in a plane parallel to a major surface of the diffusion plate.

9. The test apparatus of the direct-light-type backlight module according to claim 1, wherein the optical element further comprises an optical film, and the optical-element fixing unit further comprises a suspension member configured for hanging the optical film.

10. The test apparatus of the direct-light-type backlight module according to claim 1, wherein the test head is provided on a test rack, and the test rack is configured to move the test head in a plane parallel to a major surface of the diffusion plate.

11. The test apparatus of the direct-light-type backlight module according to claim 2, further comprising: a distance adjusting unit, configured for adjusting a distance between the light-emitting-element fixing unit and the optical-element fixing unit.

12. The test apparatus of the direct-light-type backlight module according to claim 11, wherein the distance adjusting unit comprises:

a fixing rack, provided out of the optical path of the light from the light emitting element fixed by the light-emitting-element fixing unit and having a screw nut portion; and a screw bolt, comprising a bolt head and a bolt body with a thread, wherein the bolt body penetrates into the screw nut portion of the fixing rack, and the bolt head is connected to the light-emitting-element fixing unit in a rotatable way.

13. The test apparatus of the direct-light-type backlight module according to claim 2, wherein the optical element comprises a diffusion plate, and the optical-element fixing unit comprises a plurality of diffusion-plate positioning bars configured for contacting a lateral portion of the diffusion plate.

14. The test apparatus of the direct-light-type backlight module according to claim 13, wherein at least one of the diffusion-plate positioning bars is a movable diffusion-plate positioning bar configured to be movable in a plane parallel to a major surface of the diffusion plate.

15. The test apparatus of the direct-light-type backlight module according to claim 2, wherein the optical element further comprises an optical film, and the optical-element fixing unit further comprises a suspension member configured for hanging the optical film.

16. The test apparatus of the direct-light-type backlight module according to claim 2, wherein the test head is provided on a test rack, and the test rack is configured to move the test head in a plane parallel to a major surface of the diffusion plate.

17. A test apparatus of a direct-light-type backlight module, wherein the direct-light-type backlight module comprises a light emitting element and an optical element; and the test apparatus comprises:

a light-emitting-element fixing unit, configured for fixing the light emitting element;

an optical-element fixing unit, configured for fixing the optical element into an optical path of the light emitted from the light emitting element; and a test head, configured for testing the light emitted from the light emitting element and passing through the optical element, wherein the test apparatus further comprises: a display-panel fixing unit, configured for fixing a display panel between the optical element fixed by the optical-element fixing unit and the test head, the display-panel fixing unit comprises a plurality of panel positioning bars configured for contacting a lateral portion of the display panel, and at least one of the panel positioning bars is a movable panel positioning bar configured to be moveable in a plane parallel to a major surface of the display panel.

18. A test apparatus of a direct-light-type backlight module, wherein the direct-light-type backlight module comprises a light emitting element and an optical element; and the test apparatus comprises:

a light-emitting-element fixing unit, configured for fixing the light emitting element;

an optical-element fixing unit, configured for fixing the optical element into an optical path of the light emitted from the light emitting element; and a test head, configured for testing the light emitted from the light emitting element and passing through the optical element,
wherein the optical element comprises a diffusion plate, and the optical-element fixing unit comprises a plurality of diffusion-plate positioning bars configured for contacting a lateral portion of the diffusion plate,
at least one of the diffusion-plate positioning bars is a movable diffusion-plate positioning bar configured to be movable in a plane parallel to a major surface of the diffusion plate.

* * * * *